Jan. 20, 1970  A. BAUMEISTER ET AL  3,490,460
COMBINE HARVESTER

Filed Nov. 21, 1967

Inventors
ALOIS BAUMEISTER &
FRANZ JOSEPH HERBSTHOFER
BY
Tweedale & Gerhardt
Attorneys

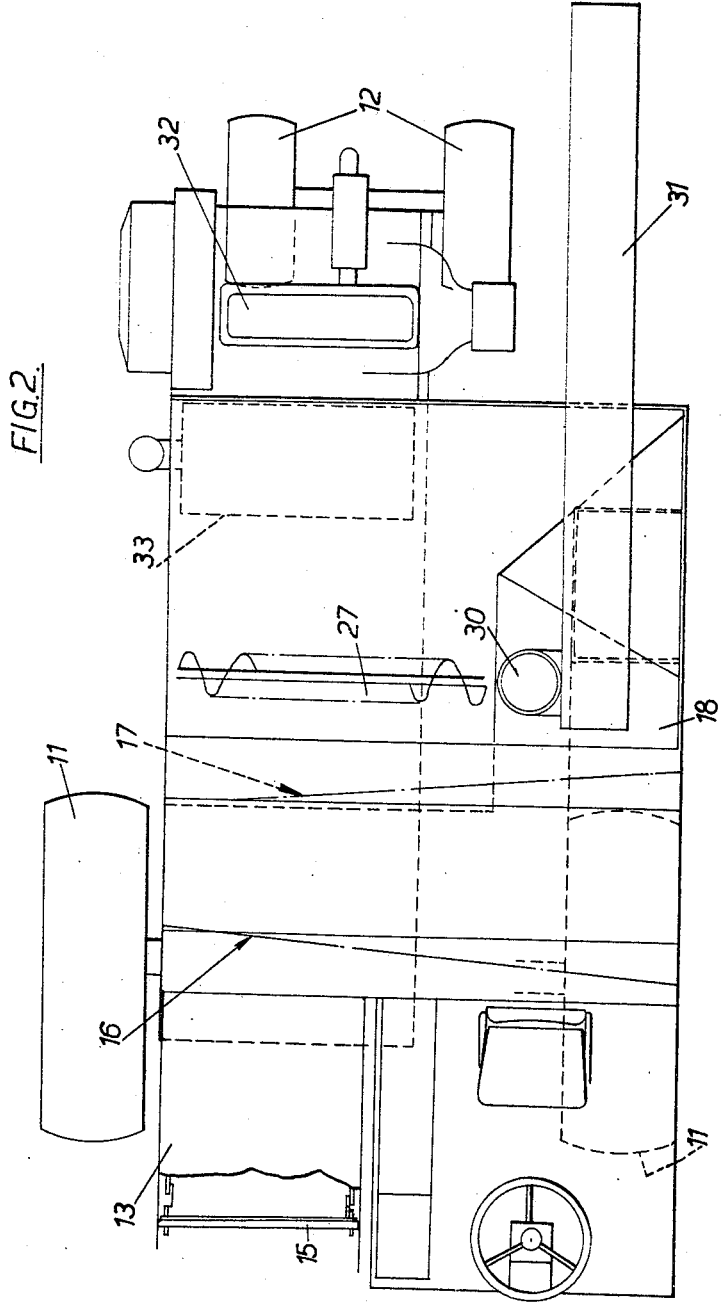

3,490,460
COMBINE HARVESTER
Alois Baumeister, Kassel, and Franz Joseph Herbsthofer, Kassel-Harleshausen, Germany, assignors to Massey-Ferguson G.m.b.H., Kassel, Germany
Filed Nov. 21, 1967, Ser. No. 684,836
Claims priority, application Great Britain, Nov. 29, 1966, 53,277/66
Int. Cl. A01f 7/00, 12/20, 12/28
U.S. Cl. 130—27                          4 Claims

ABSTRACT OF THE DISCLOSURE

The components of a combine harvester are arranged so as to provide a compact machine by utilizing the available space and to place a rotary threshing and separating mechanism into the environment of the other harvester parts which do not include straw walkers.

---

Figure 1:
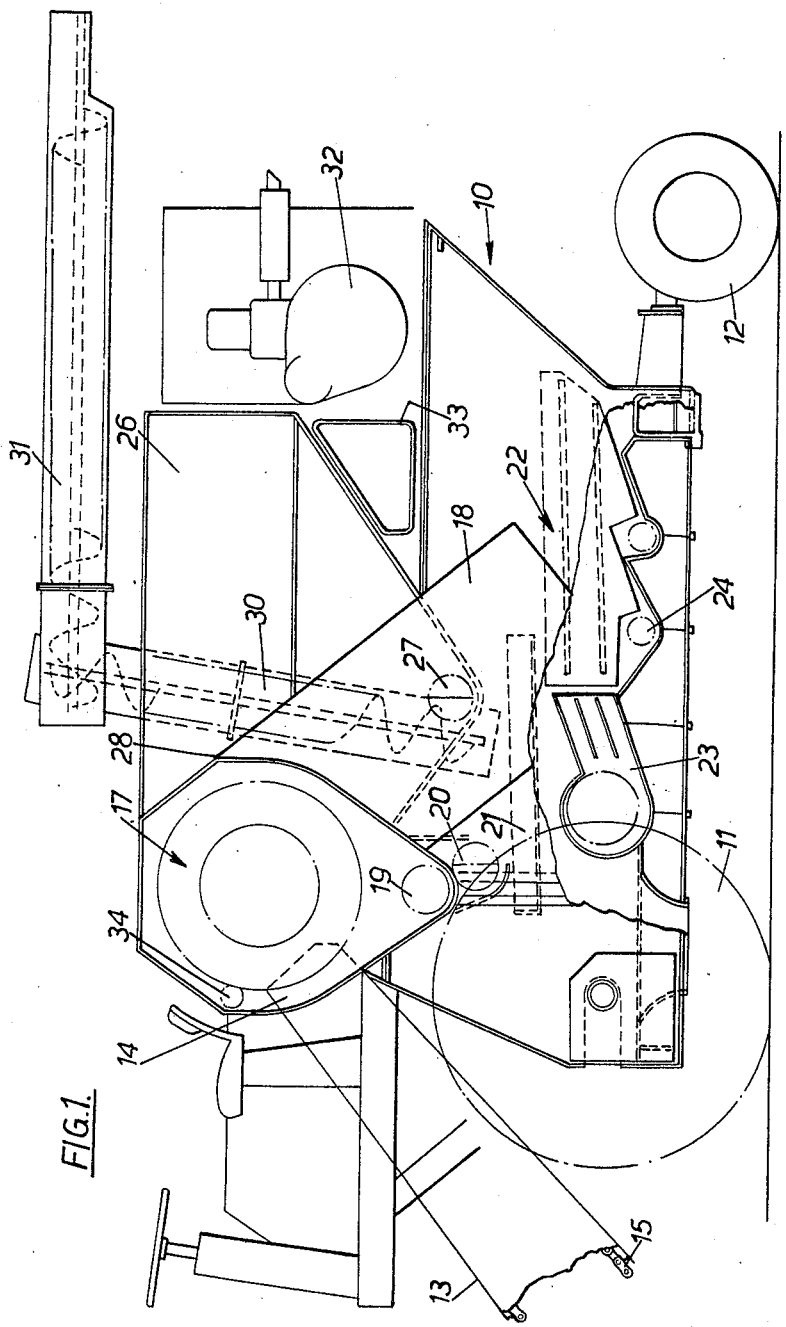

This invention relates to combine harvesters of the type including a rotary threshing and separating mechanism whose axis is transverse of the harvester and which has co-axial co-operating members having a relatively small diameter at one end and a relatively large diameter at the other end and adapted to receive crop material between them from a header through a peripheral inlet opening in the relatively small diameter end of the outer member, the crop material being conveyed between them in a helical path so that the material is threshed and grain or seed (hereinafter referred to as "grain") separated from the straw, chaff and trash (hereinafter referred to as "straw") as the material is moved axially of the mechanism, the straw being ejected through an outlet opening at the relatively large diameter end at one side of the harvester, and the separated grain passing via grain-collecting means from the threshing and separating mechanism to grain-cleaning means situated rearwardly of the threshing and separating mechanism.

It is an object of the invention to provide a combine harvester of the type stated which is of compact construction.

According to the invention there is provided a combine harvester of the type stated in which the grain-cleaning means is both below and rearwardly of the threshing and separating mechanism, a conveyor extends from the cleaning means and acts to deliver cleaned grain to a grain-handling station or grain tank situated above said grain-cleaning means, and an engine for driving the combine is located adjacent the grain-handling station or grain tank at the side thereof remote from the threshing and separating mechanism.

An embodiment of the invention will now be described, by way of example, with reference to the accompanying drawings, in which FIGS. 1 and 2 are, respectively, a side elevation and a plan view of a combine harvester according to the invention.

Referring to the drawings, the combine harvester includes a body 10 supported on front driven and rear steerable ground wheels 11 and 12, respectively. An elevator 13 is located at the front of the combine and the usual cutting table (not shown) is pivoted at 14 to the elevator to give table height adjustment. The conventional elevator chain 15 brings crop material from the table and passes it to an inlet opening located at 16 giving access to a conical threshing unit 17.

The threshing unit 17 which provides threshing means without straw walkers is similar to that described in U.S. Patent No. 3,296,782 and includes a threshing drum and co-operating reaction member arranged co-axially and both having a relatively small diameter at the inlet end and a relatively large diameter at the outlet end, crop material being introduced through the inlet opening 16 to a small clearance between the drum and reaction member, the crop material being conveyed axially and helically along and around the clearance during which time the crop material is threshed and the grain separated from the straw. The latter is ejected through a chute 18, the discharge end of which is arranged along one side of the combine and outside the rear wheel track.

Grain separated from the straw in the threshing and separating mechanism passes through the reaction member and is collected by an auger 19 and passed to a distributing auger 20 which places it evenly on a grain pan 21. The grain is then conveyed to a conventional cleaning mechanism including a shaker shoe assembly 22 and fan 23. The grain is collected by a cross auger 24 and delivered by a vertical conveyor (not shown) to a grain tank 26. The grain tank 26 has a floor which slopes downwardly from both the fore and aft directions (see FIG. 1) to a median zone whereat an auger 27 is provided to spread the grain across the tank. The rear wall 28 of a casing surrounding the threshing and separating mechanism forms the front wall of the grain tank. Grain is unloaded through augers 27, 30 and 31, the auger 31 being pivoted about a vertical axis so that it may be swung through 90° to move it from the transport position shown, to an unloading position in which it projects sidewise from the combine.

An engine 32 for driving the combine and the various operative parts thereof is situated immediately behind the grain tank. An engine fuel tank 33 is disposed below the afterpart of the sloping floor of the grain tank and provides some rigidity to the structure.

An auger 34 extends over the top of the elevator and serves to clear grain, which comes out all around the reaction member, from over the elevator.

In a modification the grain tank may be replaced by a grain handling station, such as a bagging-off platform.

We claim:

1. In a combine harvester having a rotary threshing and separating mechanism with an inner and an outer member, and a grain handling means, the combination comprising a grain-cleaning means which is located both below and rearwardly of the threshing and separating mechanism, a conveyor extending from the grain-cleaning means and acting to deliver cleaned grain to the grain-handling means situated above said grain-cleaning means, and an engine for driving the harvester which is located adjacent the grain-handling means at the side thereof remote from the threshing and separating mechanism.

2. The combination according to claim 1, in which the grain-handling means includes a wall in common with a casing surrounding the threshing and separating mechanism.

3. The combination according to claim 1 in which an auger is provided adjacent the inlet opening in the outer member of the rotary threshing and separating mechanism.

4. The combination according to claim 1, in which the grain-handling means is a grain tank and has a floor which slopes downwardly from both the fore and aft directions to a median zone, and an engine fuel tank is disposed below the upper part of said sloping floor thus adding rigidity to the structure.

References Cited

UNITED STATES PATENTS

| | | | |
|---|---|---|---|
| 2,612,742 | 10/1952 | Heth | 130—27 |
| 2,822,812 | 2/1958 | Edwards | 56—21 |
| 2,999,347 | 9/1961 | Horne et al. | 56—21 |

ANTONIO F. GUIDA, Primary Examiner